United States Patent
Suguro et al.

(10) Patent No.: US 11,539,262 B2
(45) Date of Patent: Dec. 27, 2022

(54) CONNECTION STRUCTURE OF ELECTRIC COMPONENT, MOTOR AND CONNECTION METHOD OF ELECTRIC COMPONENT

(71) Applicant: NIDEC SANKYO CORPORATION, Nagano (JP)

(72) Inventors: Hiroshige Suguro, Nagano (JP); Takanori Ohkawa, Nagano (JP); Osamu Kodaira, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 620 days.

(21) Appl. No.: 16/490,597

(22) PCT Filed: Feb. 7, 2018

(86) PCT No.: PCT/JP2018/004144
§ 371 (c)(1),
(2) Date: Sep. 3, 2019

(87) PCT Pub. No.: WO2018/159239
PCT Pub. Date: Sep. 7, 2018

(65) Prior Publication Data
US 2020/0014275 A1    Jan. 9, 2020

(30) Foreign Application Priority Data

Mar. 3, 2017 (JP) .............................. JP2017-040317

(51) Int. Cl.
*H02K 5/10* (2006.01)
*H02K 5/22* (2006.01)
*H01R 13/52* (2006.01)

(52) U.S. Cl.
CPC ......... *H02K 5/225* (2013.01); *H01R 13/5202* (2013.01); *H01R 13/5213* (2013.01); *H01R 2201/10* (2013.01)

(58) Field of Classification Search
CPC ............. H02K 5/24; H02K 5/225; H02K 5/10
See application file for complete search history.

(56) References Cited

U.S. PATENT DOCUMENTS 4,523,117 A * 6/1985 Daniels ................. H02K 11/40
174/665
5,767,596 A * 6/1998 Stark ....................... H02K 5/04
310/91

(Continued)

FOREIGN PATENT DOCUMENTS

| CN | 203415751 | 1/2014 |
| JP | S5126482 | 2/1976 |

(Continued)

OTHER PUBLICATIONS

"Office Action of China Counterpart Application", dated May 14, 2020, with English translation thereof, p. 1-p. 15.

(Continued)

*Primary Examiner* — Dang D Le
(74) *Attorney, Agent, or Firm* — JCIPRNET

(57) ABSTRACT

A connection structure of an electric component, a motor and a connection method of an electric component are provided. The connection structure of the electric component includes: an electric component main body having a connection terminal; a connector for wiring which is connected with the connection terminal; a base member; and a cover member. The base member is provided with an accommodation recessed part which accommodates inside a connected portion between the connection terminal and the connector. The accommodation recessed part has an opening part opened to an upper side. The cover member is attached to the base member so as to cover the opening part. An inside of the accommodation recessed part is filled with a sealing material which seals the connected portion between the connection terminal and the connector, and the sealing (Continued)

material fixes the connected portion, the base member and the cover member to each other.

11 Claims, 7 Drawing Sheets

(56) References Cited

U.S. PATENT DOCUMENTS

| | | | | |
|---|---|---|---|---|
| 6,809,445 | B2* | 10/2004 | Reddy | H02K 5/225 |
| | | | | 310/71 |
| 7,105,961 | B2* | 9/2006 | Tetsuka | H02K 3/50 |
| | | | | 310/43 |

FOREIGN PATENT DOCUMENTS

| | | |
|---|---|---|
| JP | H07242968 | 9/1995 |
| JP | 3019353 | 12/1995 |
| JP | H11242968 | 9/1999 |
| JP | 2002325005 | 11/2002 |
| JP | 2005253138 | 9/2005 |
| JP | 2009087855 | 4/2009 |

OTHER PUBLICATIONS

"International Search Report (Form PCT/ISA/210) of PCT/JP2018/004144," dated Mar. 20, 2018, with English translation thereof, pp. 1-4.

* cited by examiner

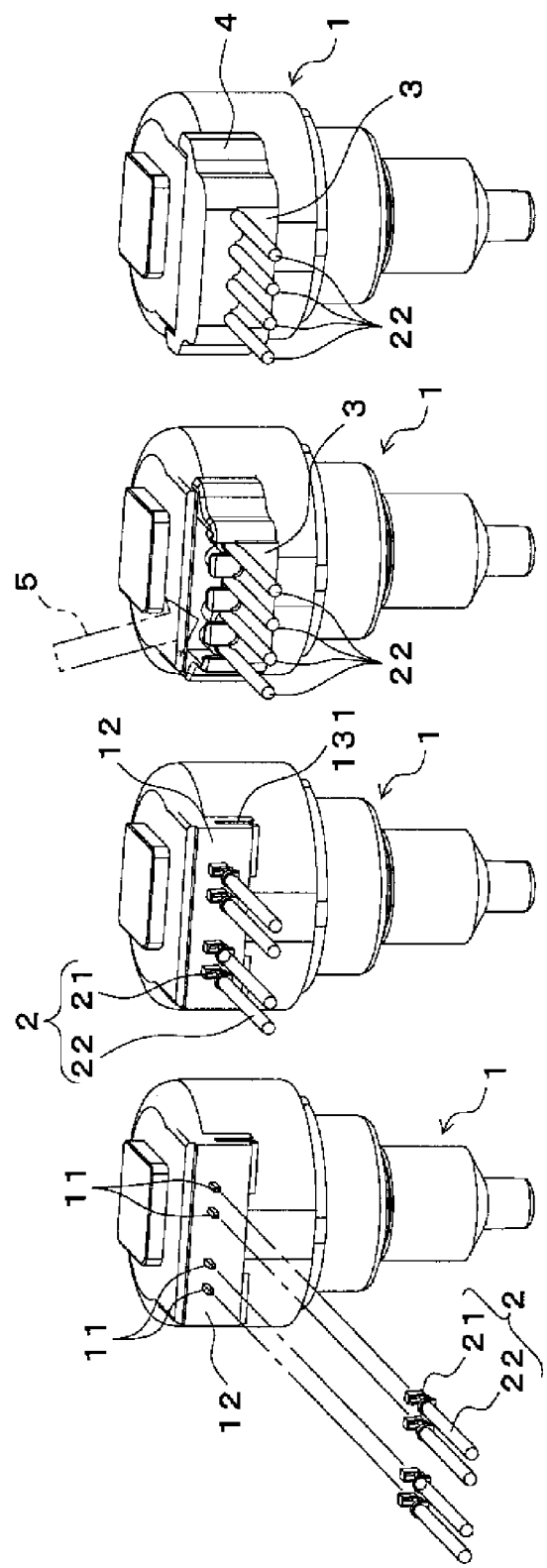

CONNECTION STRUCTURE OF ELECTRIC COMPONENT, MOTOR AND CONNECTION METHOD OF ELECTRIC COMPONENT

CROSS-REFERENCE TO RELATED APPLICATION

This application is a 371 application of the international PCT application serial no. PCT/JP2018/004144, filed on Feb. 7, 2018, which claims the priority benefits of Japan application no. 2017-040317, filed on Mar. 3, 2017. The entirety of each of the above-mentioned patent applications is hereby incorporated by reference herein and made a part of this specification.

TECHNICAL FIELD

The present invention relates to a structure and a method for connecting an electric component such as a motor with a connector such as a wire harness.

BACKGROUND ART

As a structure for connecting a motor with a connector, the applicant of the present application has proposed, for example, the structure described in Patent Literature 1 described below. In this structure, connection terminals are provided in a motor main body, and when a connector of a wire harness is attached to the connection terminals, a motor and the wire harness are electrically connected with each other.

In an application under severe vibration and dust conditions like an on-vehicle motor, a structure capable of further surely maintaining electrical connection is required.

CITATION LIST

Patent Literature

[Patent Literature 1] Japanese Patent Laid-Open No. 2005-253138

SUMMARY

Technical Problems

The present invention is provided in view of the above-mentioned situation. A principal objective of the present invention is to provide a connection structure or a motor capable of maintaining sure connection between an electric component and a connector, even under severe vibration and dust conditions. Another objective of the invention is to provide a connection method for obtaining the connection structure or the motor.

Solutions to Problems

The means for solving the above-mentioned problem may be described below as the following items.

A connection structure of an electric component, includes: an electric component main body having a connection terminal; a connector for wiring which is connected with the connection terminal; a base member; and a cover member. The base member is provided with an accommodation recessed part which accommodates inside a connected portion between the connection terminal and the connector, and the accommodation recessed part has an opening part opened to an upper side. The cover member is attached to the base member so as to cover the opening part. And, an inside of the accommodation recessed part is filled with a sealing material which seals the connected portion between the connection terminal and the connector, and the sealing material fixes the connected portion, the base member and the cover member to each other. According to the present invention, a connected portion between the connection terminal and the connector can be sealed by the sealing material filled in the accommodation recessed part. In addition, the connected portion, the base member and the cover member are fixed to each other with the sealing material as a center, and thus, a strong sealing state can be obtained.

In the present invention, an inner face of the cover member facing the accommodation recessed part is formed with a protruded part which is protruded toward the sealing material filled in the accommodation recessed part and is adhered to the sealing material. Therefore, when the protruded part is adhered to the sealing material, the sealing state can be further firmly maintained, and in addition, a used amount of the sealing material is reduced and leakage of the sealing material can be suppressed.

In the present invention, the base member may be provided with a boss hole which accommodates a tip end of the protruded part. Further, the base member may be formed with a rib so as to be protruded toward the sealing material. In addition, it may be structured that the base member is formed with a protruding shaped part on an inner face of a side part of the base member, and that the electric component main body is formed with a guide groove which is abutted with the protruding shaped part to guide the base member. In these cases, it is desirable that a side part of the cover member is disposed so as to cover an outer side of a side part of the base member in a state that the cover member is attached to the base member.

In the present invention, it may be structured that the connector includes: a fixing tool which is connected with the connection terminal of the electric component main body; and a wire which is electrically connected with the connection terminal through the fixing tool. The cover member is provided with an upper side recessed part for accommodating the wire. The base member is provided with a lower side recessed part at a position facing the upper side recessed part. And, a through-hole for passing the wire to an outer side is formed by the upper side recessed part and the lower side recessed part. Further, the electric component main body in the present invention may be a motor.

A connection method of an electric component which uses an electric component main body having a connection terminal, a connector connected with the connection terminal, a base member provided with an accommodation recessed part having an opening part opened to an upper side, and a cover member includes: a disposing process, in which the base member is disposed so that a connected portion between the connection terminal and the connector is accommodated in the accommodation recessed part of the base member; a filling process, in which a sealing material is filled in an inside of the accommodation recessed part so as to seal the connected portion between the connection terminal and the connector; an attaching process, in which the cover member is attached to the base member so as to cover the opening part of the accommodation recessed part and contact with the sealing material; and a hardening process, in which the sealing material is hardened to fix the connected portion between the connection terminal and the connector, the base member, and the cover member to each other.

Effect of the Invention

According to the present invention, even under severe vibration and dust conditions, a connection structure or a motor capable of maintaining sure connection between an electric component and a connector can be provided. Further, according to the present invention, a connection method for obtaining the connection structure can be provided.

BRIEF DESCRIPTION OF THE DRAWINGS

FIGS. 14A through 14D are explanatory views for explaining a connection method for obtaining a connection structure in FIG. 1.

DESCRIPTION OF EMBODIMENTS

Figure 1:
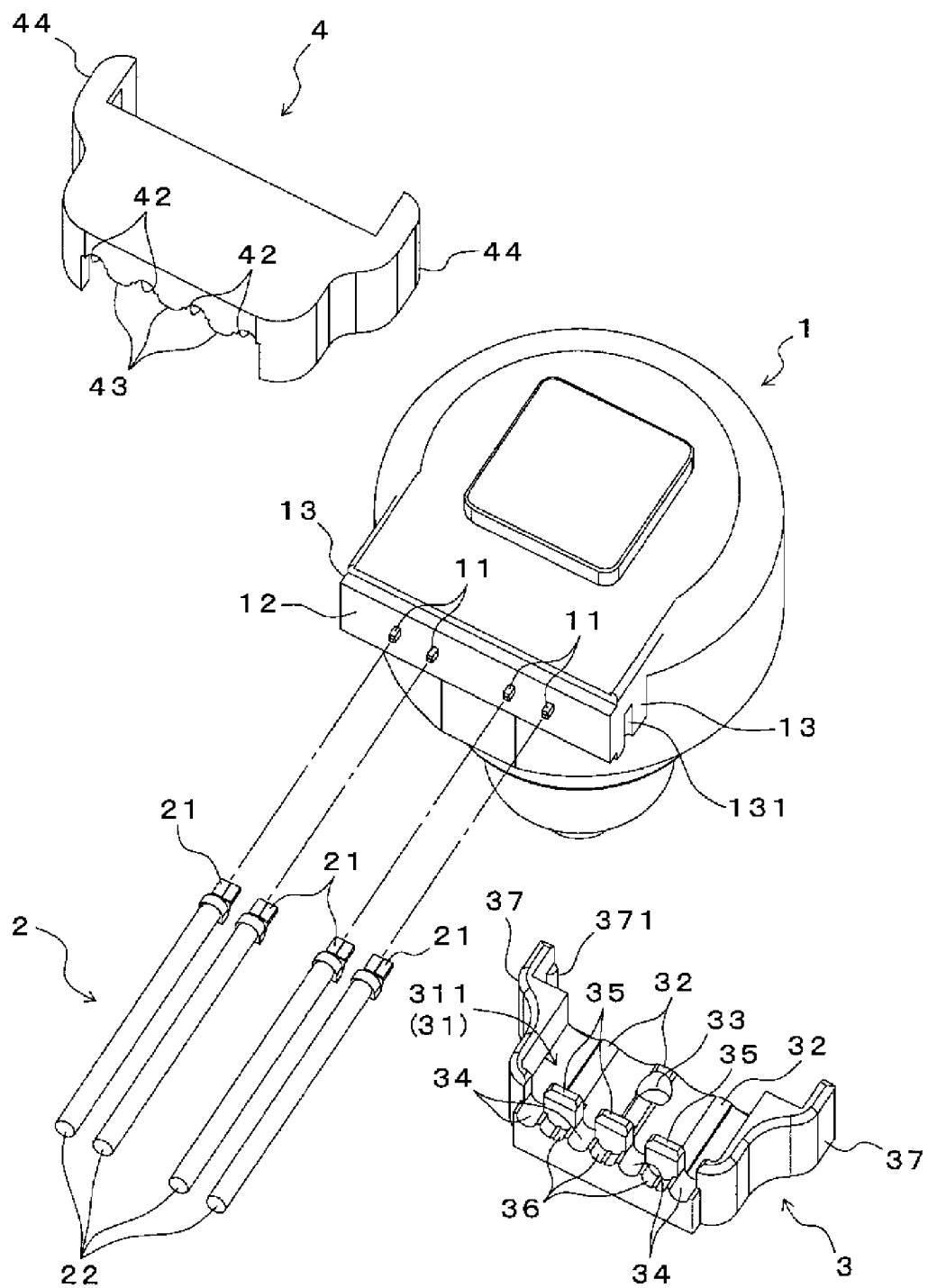
FIG. 1 is an exploded perspective view showing a connection structure of an electric component in accordance with an embodiment of the present invention.

A connection structure of an electric component in accordance with an embodiment of the present invention (hereinafter, it may be simply referred to as a "connection structure") will be described below with reference to the accompanying drawings.

(Structure of this Embodiment)

A connection structure in this embodiment includes an electric component main body 1, a connector 2 for wiring, a base member 3 and a cover member 4 as basic structure elements.

(Electric Component Main Body)

An electric component main body 1 in this embodiment is not limited in particular but, for example, a motor. A surface of the electric component main body 1 is formed with connection terminals 11 which are to be connected with the connector 2 so as to be protruded in a surface direction (see FIG. 1 and FIG. 2). In the present specification, the surface from which the connection terminals 11 are protruded is referred to as an attaching face 12. The number of the connection terminals 11 is four in this embodiment, but it is not limited in particular.

Each of both right and left side faces 13 of the electric component main body 1 is formed with a guide groove 131 which guides a protruding shaped part 371 (described below) formed in a side part 37 of the base member 3.

(Connector for Wiring)

The connector 2 includes: fixing tools 21 which are respectively connected with the connection terminals 11 of the electric component main body 1; and wires 22 which are electrically connected with the connection terminals 11 through the fixing tools 21. The fixing tool 21 in this embodiment is fixed to the connection terminal 11 so as to be capable of being attached and detached through fitting. Further, in this embodiment, the fixing tool 21 fitted to the connection terminal 11 is surely joined to the connection terminal 11 by soldering. However, without using the fixing tool 21, for example, it may be structured that a wire 22 is connected with the connection terminal 11 by an appropriate fixing means such as soldering to structure a connection part.

(Base Member)

Figure 2:
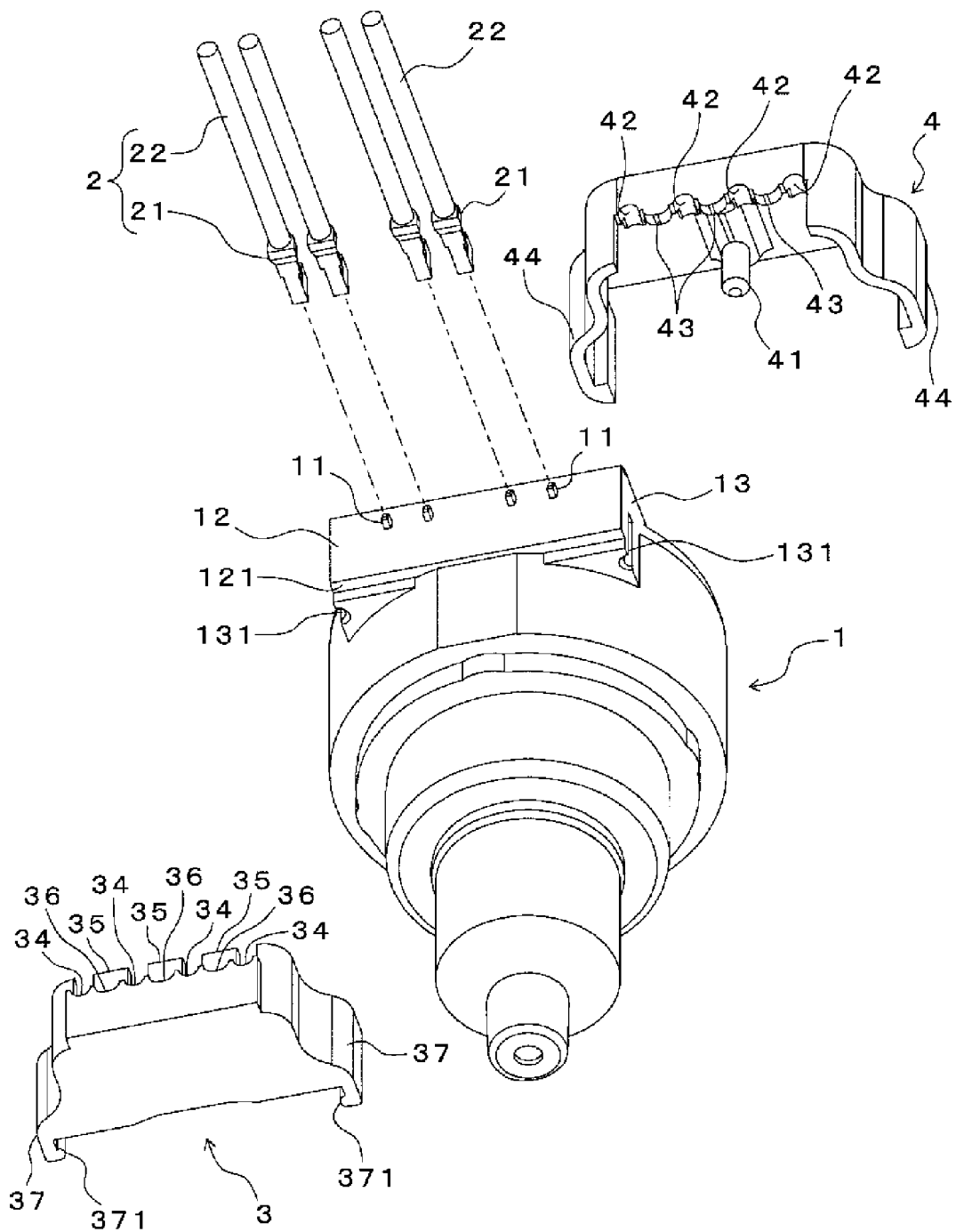
FIG. 2 is an exploded perspective view showing a state which is viewed from a lower side in FIG. 1.
Figure 7:
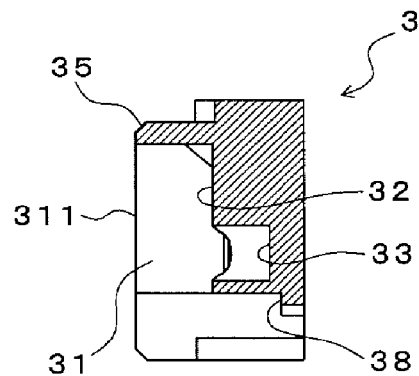
FIG. 7 is a cross-sectional view along the "A-A" line in FIG. 6.
Figure 8:
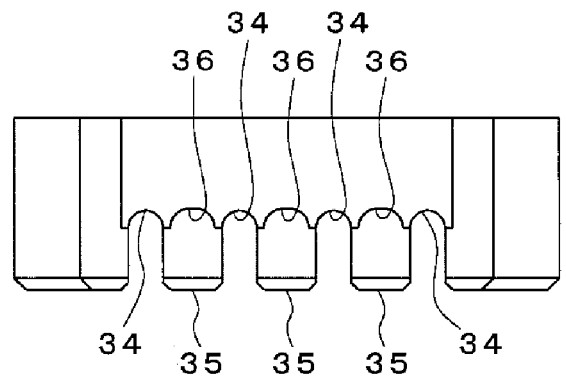
FIG. 8 is a plan view in FIG. 6.
Figure 9:
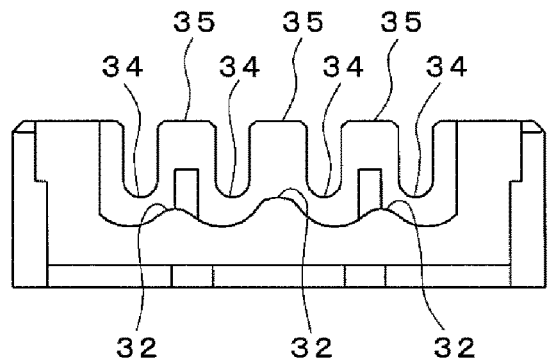
FIG. 9 is a bottom view in FIG. 6.
Figure 10:
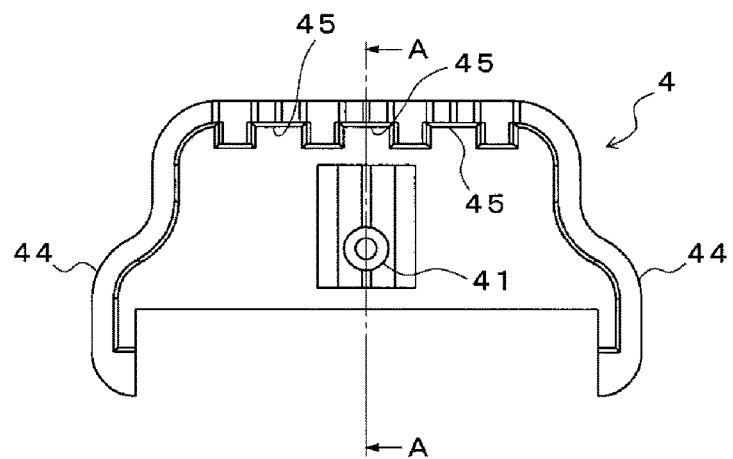
FIG. 10 is a front view showing a cover member.
Figure 11:
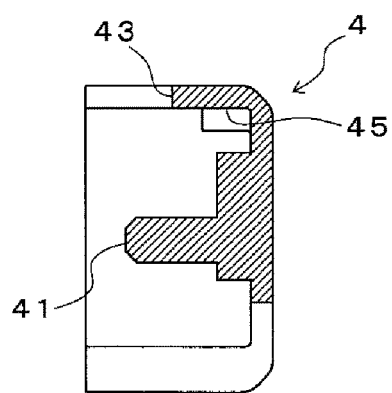
FIG. 11 is a cross-sectional view along the "A-A" line in FIG. 10.
Figure 12:
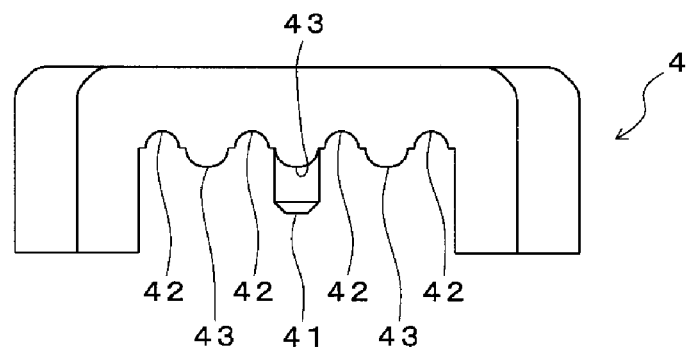
FIG. 12 is a plan view in FIG. 10.
Figure 13:
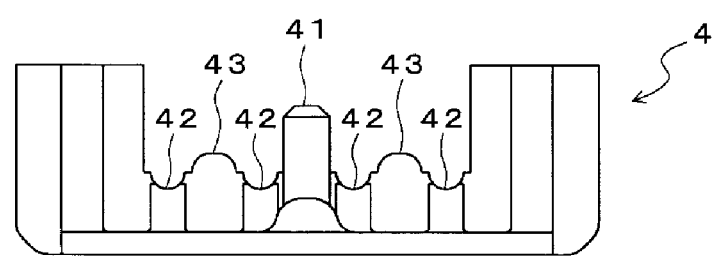
FIG. 13 is a bottom view in FIG. 10.

The base member 3 is provided with an accommodation recessed part 31 which accommodates the connection parts of the connection terminals 11 with the connector 2 in its inside and has an opening part 311 which is opened to an upper side (see FIG. 1 and FIG. 7).

Figure 6:
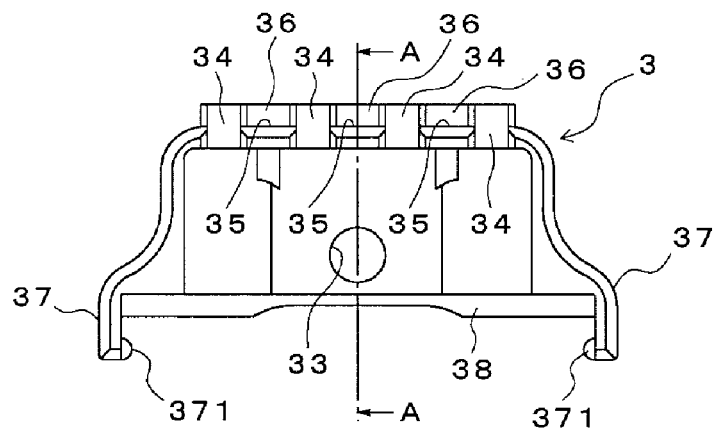
FIG. 6 is a front view showing a base member.

More specifically, the base member 3 in this embodiment is provided with three ribs 32 (see FIG. 6) formed so as to protrude between the wires 22 and a boss hole 33 which accommodates a tip end of a protruded part 41 (described below) of the cover member 4 in its inside.

Further, a front side of the base member 3 is formed with lower side recessed parts 34 which accommodate the wires 22, guide parts 35 which guide a front side inner face of the cover member 4, and lower side circular arc faces 36 which accommodate upper side circular arc faces 43 (described below) of the cover member 4 on inner sides. In the description in this embodiment, a direction where the wire 22 is extended (for example, a left lower direction in FIG. 1) is referred to as a "front side" or a "front", and the opposite direction is referred to as a "rear side" or a "rear".

The guide parts 35 are disposed at positions facing the lower side circular arc faces 36 and, in addition, a gap which accommodates and positions the wire 22 is formed between the guide parts 35.

In addition, inner faces of both right and left side parts 37 of the base member 3 are formed with the above-mentioned protruding shaped parts 371 which are accommodated in the above-mentioned guide grooves 131 of the electric component main body 1.

Figure 5:
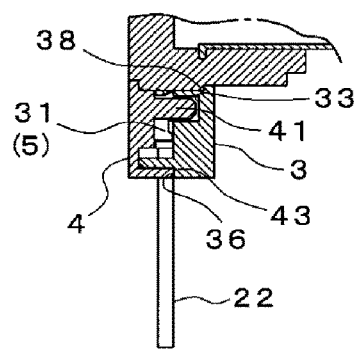
FIG. 5 is a cross-sectional view showing the main part along the "B-B" line in FIG. 3.

Further, an abutting part on a lower side of the base member 3 with a lower end face 121 (see FIG. 2) of the attaching face 12 of the electric component main body 1 is formed with a step part 38 (see FIG. 5 through FIG. 7) for easily making tightly contact with each other. The step part 38 tightly contacts with the lower end face 121 and thus, the step part 38 provides a structure so that a sealing material 5 filled in the accommodation recessed part 31 is hard to leak out to a lower side.

(Cover Member)

The cover member 4 is attached to the base member 3 so as to cover the opening part 311 of the accommodation recessed part 31.

An inner face of the cover member 4 in this embodiment which faces the accommodation recessed part 31 is formed with a protruded part 41 which is protruded toward the sealing material 5 filled in the accommodation recessed part 31 and is adhered to the sealing material 5 (see FIG. 2, FIG. 5, FIG. 10 through FIG. 13).

Figure 4:
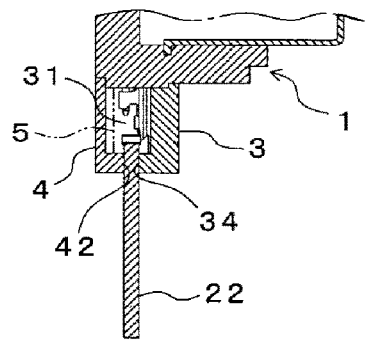
FIG. 4 is a cross-sectional view showing the main part along the "A-A" line in FIG. 3.

An inside of the accommodation recessed part 31 is filled with the sealing material 5 (see FIG. 4 and FIG. 14C) which seals connected portions between the connection terminals 11 and the connector 2, and in addition, which adheres the connected portions, the base member 3 and the cover member 4 mutually. The sealing material 5 will be described below.

Further, a front side under face of the cover member 4 is formed with upper side recessed parts 42 for accommodating the wires 22 on inner sides. The upper side recessed part 42 is formed at a position facing the lower side recessed part 34 of the base member 3, and a through-hole for passing the wire 22 to an outer side can be formed by both the recessed parts.

In addition, the front side under face of the cover member 4 is formed with upper side circular arc faces 43 at a position facing the lower side circular arc faces 36 of the base member 3. These upper and lower circular arc faces 36 and 43 are tightly contacted with each other (see FIG. 5 and FIG. 14D) and an outflow of the sealing material 5 from the inside can be restricted.

Figure 3:
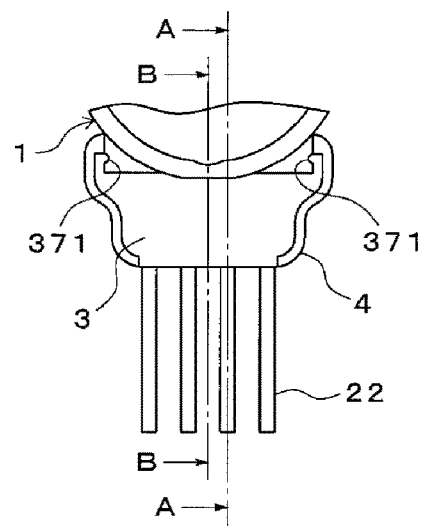
FIG. 3 is a bottom view showing a main part in an assembly state of a connection structure in FIG. 1.

Side parts 44 of the cover member 4 cover outer sides of the side parts 37 of the base member 3 in a state attached to the base member 3 (see FIG. 3 and FIG. 14D).

Further, a front side inner face of the cover member 4 is formed with guide grooves 45 which accommodate the guide parts 35 of the base member 3 on an inner side to improve a sealing degree between the base member 3 and the cover member 4.

(Sealing Material)

The sealing material 5 (see FIG. 4 and FIG. 14C) is, as described above, filled in the inside of the accommodation recessed part 31 of the base member 3 and, as a result, the sealing material 5 seals the connected portions between the connection terminals 11 of the electric component main body 1 and the fixing tools 21 of the connector 2. In addition, the sealing material 5 in this embodiment fixes the connected portions between the connection terminals 11 of the electric component main body 1 and the fixing tools 21 of the connector 2, an inner face of the base member 3, and an inner face of the cover member 4 to each other. More specifically, the sealing material 5 adheres to a surface of the attaching face 12 of the electric component main body 1 and thereby, the electric component main body 1, the fixing tools 21 of the connector 2 for wiring, the base member 3 and the cover member 4 are fixed to each other through the sealing material 5. As a result, according to the structure in this embodiment, sealing of the terminal portions by the sealing material 5 and fixing of these parts can be attained simultaneously.

As the sealing material 5 in this embodiment, although not limited in particular, for example, an epoxy-based or acrylic-based adhesive of a two-liquid curable type, photocurable type or temperature curable type may be used. However, the sealing material 5 in this embodiment may utilize material which has a function required to fix the above-mentioned respective members to each other and, in addition, has a sufficient hardness for sealing the connected portions of the connector 2 for wiring in a hardened state after being filled. Further, in a case of a photocurable type, it is preferable that the sealing material 5 is cured by light transmitting through the cover member 4 or the base member 3.

(Connection Method of Electric Component in this Embodiment)

Next, a connection method of an electric component for forming the above-mentioned connection structure will be described below mainly with reference to FIGS. 14A through 14D.

(FIGS. 14A and 14B)

First, the fixing tools 21 of the connector 2 are attached to the respective connection terminals 11 in a state that the connection terminals 11 of the electric component main body 1 are exposed. Next, both the fixing tools 21 and the connection terminals 11 are soldered to each other and thereby the electric connections can be performed surely.

(FIG. 14C)

Next, the base member 3 is disposed on a lower side of the attaching face 12 of the electric component main body 1 in a state that the opening part 311 of the accommodation recessed part 31 faces an upper side. In this state, the protruding shaped part 371 formed on an inner face of the side part 37 of the base member 3 is accommodated in the guide groove 131 formed in the side face 13 of the electric component main body 1 and thereby, the base member 3 can be positioned with respect to the electric component main body 1. In this case, an appropriate jig (not shown) may be auxiliarily used for positioning the base member 3.

In this state, the wires 22 of the connector 2 are accommodated in the inside of the lower side recessed part 34 of the base member 3 and are positioned. In addition, the ribs 32 of the base member 3 are disposed between the respective wires and thus, excessive approaching of the wires each other can be prevented by the rib 32. Further, in this embodiment, the wires 22 can be also positioned by accommodating the wires 22 in the gaps formed between the guide parts 35.

Next, the sealing material 5 in a flowable state is filled in the accommodation recessed part 31 of the base member 3 by a sealing material injection means (for example, a nozzle) not shown. In this embodiment, the base member 3 is formed with the guide parts 35 which are protruded to an upper side and thus, risk of leakage of the sealing material from the lower side recessed parts 34 can be reduced.

The connected portions between the connection terminals 11 and the connector 2 can be sealed by filling work of the sealing material 5.

In this embodiment, it is preferable that a filling amount of the sealing material 5 is set to be an amount not reaching the opening end (upper end in FIG. 14C) of the opening part 311 of the accommodation recessed part 31, for example, about 80% of the fillable volume. According to this structure, a leakage amount of the sealing material 5 at the time of attaching the cover member 4 described below can be restricted low.

(FIG. 14D)

Next, the cover member 4 is attached so as to cover the opening part 311 of the base member 3. In this case, the protruded part 41 of the cover member 4 is fitted to the boss hole 33 of the base member 3. As a result, a tip end of the protruded part 41 is pushed into the sealing material 5 filled in the accommodation recessed part 31 of the base member 3 and the protruded part 41 can be surely contacted with the sealing material 5. Further, in this embodiment, the cover member 4 can be precisely positioned with respect to the base member 3 by fitting the protruded part 41 into the boss hole 33.

Further, the upper side recessed part 42 formed on the front side of the cover member 4 forms a through-hole together with the lower side recessed part 34 of the base member 3 therebetween as described above and the wire 22 is capable of passing through the through-hole.

In addition, in this embodiment, the upper side circular arc faces 43 of the cover member 4 are abutted with and accommodated in the lower side circular arc faces 36 of the base member 3 and thus, a leakage amount of the sealing material 5 in a contacted part of the cover member 4 with the base member 3 can be restricted low.

Further, in this embodiment, the protruded parts 35 of the base member 3 are accommodated in the guide grooves 45 of the cover member 4 and thus, the cover member 4 can be further effectively positioned and, in addition, since they are fitted to each other, leakage of the sealing material 5 can be also restricted.

Next, the sealing material 5 is hardened depending on a property of the sealing material 5. For example, when thermosetting resin is used, heat required for curing is applied to the sealing material 5. As a result, in the structure in this embodiment, the connected portions of the connector 2 with the connection terminals 11 can be sealed surely. In addition, in this embodiment, the respective components covering around the sealing material 5 having been filled inside as a center are adhered and fixed to each other and thus, even under severe vibration and dust conditions, connection of the connector 2 with the connection terminals 11 can be surely maintained.

Further, in a manufacturing method in this embodiment, before the sealing material 5 is hardened, the opening part 311 of the base member 3 (in other words, an opening face of the sealing material 5) can be covered by the cover member 4 and thus, the electric component main body 1 can be conveyed before the sealing material 5 is hardened. As a result, a required time in the manufacturing process can be shortened.

Further, in the structure in this embodiment, the base member 3 is formed with the ribs 32 and thus, an amount of the sealing material 5 to be filled in the accommodation recessed part 31 of the base member 3 can be reduced and, in addition, formation of a void between the sealing material 5 and a lower face of the accommodation recessed part 31 can be suppressed.

Although the present invention has been shown and described with reference to a specific embodiment, various changes and modifications will be apparent to those skilled in the art from the teachings herein.

The invention claimed is:

1. A connection structure of an electric component, comprising:
    an electric component main body having a connection terminal;
    a connector for wiring which is connected with the connection terminal;
    a base member; and
    a cover member;
    wherein the base member comprises an accommodation recessed part which accommodates inside a connected portion between the connection terminal and the connector, and the accommodation recessed part has an opening part opened to an upper side;
    wherein the cover member is attached to the base member so as to cover the opening part; and
    wherein an inside of the accommodation recessed part is filled with a sealing material which seals the connected portion between the connection terminal and the connector, and the sealing material fixes the connected portion, the base member and the cover member to each other,
    the cover member has an upper side circular arc face,
    the base member has a lower side circular arc face at a position facing the upper side circular arc face,
    the upper side circular arc face and the lower side circular arc face contact each other.

2. The connection structure of an electric component according to claim 1, wherein
    an inner face of the cover member facing the accommodation recessed part is formed with a protruded part which is protruded toward the sealing material filled in the accommodation recessed part and is adhered to the sealing material.

3. The connection structure of an electric component according to claim 2, wherein
    the base member comprises a boss hole which accommodates a tip end of the protruded part.

4. The connection structure of an electric component according to claim 1, wherein
    the base member is formed with a rib so as to be protruded toward the sealing material.

5. The connection structure of an electric component according to claim 1, wherein
    the base member is formed with a protruding shaped part on an inner face of a side part of the base member, and
    the electric component main body is formed with a guide groove which is abutted with the protruding shaped part to guide the base member.

6. The connection structure of an electric component according to claim 5, wherein
    a side part of the cover member is disposed so as to cover an outer side of a side part of the base member in a state that the cover member is attached to the base member.

7. The connection structure of an electric component according to claim 1, wherein the connector comprises:
    a fixing tool which is connected with the connection terminal of the electric component main body; and
    a wire which is electrically connected with the connection terminal through the fixing tool,
    wherein the cover member comprises an upper side recessed part for accommodating the wire,
    the base member comprises a lower side recessed part at a position facing the upper side recessed part, and
    a through-hole for passing the wire to an outer side is formed by the upper side recessed part and the lower side recessed part.

8. A motor, comprising:
    the connection structure of an electric component defined in claim 1,
    wherein the electric component main body is the motor.

9. The connection structure of an electric component according to claim 1, wherein
    the base member has a guide part which guides a front side inner face of the cover member,
    the cover member has a guide groove which accommodates the guide part.

10. A connection method of an electric component which uses:
    an electric component main body having a connection terminal,
    a connector which is connected with the connection terminal,
    a base member comprising an accommodation recessed part having an opening part opened to an upper side, and
    a cover member,
    wherein the cover member has an upper side circular arc face,
    the base member has a lower side circular arc face at a position facing the upper side circular arc face,
    the upper side circular arc face and the lower side circular arc face contact each other,
    the connection method comprising:
    a disposing process, in which the base member is disposed so that a connected portion between the connection terminal and the connector is accommodated in the accommodation recessed part of the base member;

a filling process, in which a sealing material is filled in an inside of the accommodation recessed part so as to seal the connected portion between the connection terminal and the connector;

an attaching process, in which the cover member is attached to the base member so as to cover the opening part of the accommodation recessed part and contact with the sealing material; and a hardening process, in which the sealing material is hardened to fix the connected portion between the connection terminal and the connector, the base member, and the cover member to each other.

11. The connection structure of an electric component according to claim 10, wherein the base member has a guide part which guides a front side inner face of the cover member, the cover member has a guide groove which accommodates the guide part.

\* \* \* \* \*